Patented Apr. 20, 1926.

1,581,619

UNITED STATES PATENT OFFICE.

NATHAN SULZBERGER, OF NEW YORK, N. Y.

ASBESTOS PAPER, ETC.

No Drawing.   Application filed August 18, 1921. Serial No. 493,421.

*To all whom it may concern:*

Be it known that I, NATHAN SULZBERGER, a citizen of the United States, residing at New York, in the county of New York, State of New York, have invented certain new and useful Improvements in Asbestos Paper, Etc.; and I do hereby declare the following to be a full, clear, and exact description of the invention, such as will enable others skilled in the art to which it appertains to make and use the same.

This invention relates to improvements in asbestos paper, asbestos sheets, and other asbestos articles adapted for use for various purposes.

Asbestos fiber or pulp is commonly made into sheets with the use of organic binders or with organic filling or sizing material, etc. When such asbestos with admixed organic matter is heated to high temperatures the organic matter tends to char, causing the asbestos to become discolored and giving off objectionable odors during the charring operation. The presence of such organic matter therefore makes the asbestos less valuable for certain of the purposes for which asbestos is particularly useful, such as high temperature insulation, etc.; while the charred residue produced by heating such asbestos to high temperatures makes the asbestos unsightly and discolored. When asbestos paper is used in making cigarette wrappers and where the asbestos paper contains an organic binder, this binder will similarly give off objectionable odors when the cigarette is smoked, and may similarly be discolored, due to the carbonization of the organic binder.

According to the present invention, I make asbestos paper and other asbestos articles which are substantially free or freed from admixed organic binder and carbonaceous material, so that they can be used without the objectionable features attending the use of asbestos admixed with such organic binders or carbonaceous material.

According to one preferred embodiment of the invention, I make the asbestos into the form of paper or sheets with the use of an inorganic colloid such as colloidal aluminum silicate, or some other suitable inorganic colloid (barium sulfate, etc.), alone or in mixture, so that the resulting paper or sheet will be free from carbonaceous material or organic binders. Paper made with a colloidal aluminum silicate (such as can be prepared with the aid of ammonia and tannic acid), incorporated therewith will be self-adhering when wetted with water or licked so that sheets of the paper can be stuck together without the use of an added adhesive, which, however, may also be used.

According to another embodiment of the invention, the asbestos is formed into a sheet or layer of suitable thickness with the aid of a suitable organic binder, and the organic binder is then more or less completely removed by subjecting the material to a heating operation at a sufficiently high temperature and under oxidizing conditions. It is desirable to heat the material for as short a time as possible to accomplish this end, as prolonged heating or heating at an excessive temperature tends to make the asbestos brittle and non-pliable. I have found it particularly advantageous to carry out the heating operation by treating the asbestos paper, before heating, with an oxidizing agent such as saltpeter which will assist in the oxidation of the carbonaceous material during the heating operations. Such an oxidizing agent may be added to the asbestos material containing an organic binder either before or after it has been made into its finished state. The oxidizing agent or agents may thus be used in the form of solutions with which the paper is treated or saturated, and the subsequently dried paper then subjected to a short heating operation to burn out the carbonaceous material. The oxidizing agent may be accompanied with small amounts of catalytic material which promote the oxidation.

The substantially non-carbonaceous asbestos of the present invention, obtainable, for example, as above described, is available for various purposes where substantially non-carbonaceous asbestos is desirable. The asbestos paper or sheets may thus be manufactured and sold for use as a non-combustible wrapping material or for heat insulation purposes or for other purposes for which asbestos sheets or paper is desired. The asbestos may serve as a carrier for catalytic material or for making paper for printing purposes or in making fireproof fabrics (such as fireproof lace or cloths), gas mantles (with or without cerium, etc.) or for insulating electric wires, etc., material, etc., bags, containers for chemicals, etc., bags for tobacco, fitting into pipes.

The asbestos paper or sheets may be formed in much the usual way, from asbestos pulp, either without the presence of an organic binder (e. g., with the use of an inorganic colloid binder) or with the use of an organic binder and subsequent removal thereof by a heating operation.

A particularly valuable application of the invention is in the manufacture of wrappers for cigarettes, and the manufacture of cigarettes therewith. For such purposes it is particularly desirable to have an asbestos paper which will not give off any objectionable odors during the smoking of the cigarette and which will not char to such an extent as to give objectionable discoloration of the asbestos wrapper due to its carbonaceous contents, when brought to a glow during smoking. I do not, however, claim herein the cigarettes made with the improved paper of the present invention or cigarette or cigar holders made therewith. Cigarettes having wrappers substantially free from carbonaceous material are claimed in my prior application Serial No. 411,850, filed September 21, 1920, of which the present application is in part a division. Cigar and cigarette holders made of asbestos substantially free from organic material are claimed in my prior application Serial No. 420,080, filed October 28, 1920. Cigarettes having an asbestos wrapper which is free from objectionable odor on smoking are also claimed in my prior application Serial No. 391,777, filed June 25, 1920.

The asbestos paper for use in making the cigarette wrappers may have an added amount of an oxidizing agent such as saltpeter incorporated therewith to promote the combustion of the tobacco during smoking. The asbestos paper (where it is made without an organic binder) can thus be treated with a solution of saltpeter, or an excess of the saltpeter can be used before the heating operation when an organic binder is used. In some cases nitro-cellulose or other oxidizing agent may be used.

The production of asbestos paper, according to the invention, will be further illustrated by the following more detailed description, which may variously be modified:

An asbestos pulp is made from 50 parts (by weight) of long fibre asbestos, 6 parts of colloidal aluminum silicate (made into a paste with about seven times its weight of water) and sufficient water to give a suitable pulp. This pulp is formed into a paper in a suitable paper making machine and is dried. The resulting paper will be substantially free from carbon or organic binder. The paper or pulp may be treated with a solution of saltpeter, especially when it is to be used for making cigarette wrappers in order to more or less avoid objectionable discoloration due to the smoking tobacco.

When an organic binder is used, the asbestos may be similarly formed into a pulp in much the usual way, and the pulp then formed into paper of appropriate thinness. The resulting sheet, before or after drying, can then be treated with a solution of saltpeter and, after further drying, subjected to a temperature sufficiently high to substantially destroy the organic binder and remove any carbonaceous residue. The destruction of the carbonaceous content of the asbestos is often accomplished with an objectionable odor. If the heating operation is properly carried out with avoidance of prolonged heating and excessive temperature, the paper is sufficiently pliable for use in forming cigarette wrappers to take the place of the ordinary cigarette paper.

The improved asbestos paper sheets, etc., are adapted for more or less general application and particularly for purposes where the asbestos is to be subjected to high temperatures such as would carbonize an organic binder and cause it to give off objectionable odors or decomposition products. In addition to the availability of such asbestos paper for cigarette wrappers, cigar or cigarette holders, etc., fireproof or fire-resisting objects, such as curtains, lamp shades, mantles, Chinese lanterns, etc., may be similarly made; as well as insulation for wires or other articles or objects which may be exposed or heated to high temperatures.

The asbestos paper or sheets or other articles may be waterproofed in part or in whole by suitable waterproofing agents. It will also not be susceptible to decomposition due to micro-organisms and the climate, causing hydrolysis and the breaking up of the cellulose molecule of ordinary paper, particularly, since without harm to the asbestos material, various chemicals (antiseptics, etc.) may be contained in the same. It may be colored and artistically painted and embossed and be made more or less transparent. Sheets, etc., of great thinness, as well as all thicknesses may be prepared. The material may also be moulded and compressed (hydraulically, etc.) into more or less solid form and stiff sheets and masses suitable for purposes of papier mâché and great resistance against fire or chemicals, etc. The surface may be smooth or rough.

The term "tissue-like" as used in the appended claims is used to indicate a thin paper such as tissue or rice paper or any paper of such thinness as to approach tissue.

I claim:—

1. Tissue-like flexible paper made of asbestos substantially free from organic matter and containing an inorganic colloid.

2. Tissue-like flexible paper made of asbestos substantially free from organic matter and containing colloidal aluminum silicate.

3. Tissue-like flexible paper made of asbestos substantially free from organic matter and containing only a small fractional part of the weight of the asbestos of colloidal aluminum silicate.

4. A thin flexible asbestos paper containing an inorganic colloid as a binder, said paper being of a thinness adapting it for use as a cigarette paper.

5. A thin flexible asbestos paper containing colloidal aluminum silicate as a binder, said paper being of a thinness adapting it for use as a cigarette paper.

In testimony whereof I affix my signature.

NATHAN SULZBERGER.